United States Patent [19]

Mumcu et al.

[11] Patent Number: 4,459,389

[45] Date of Patent: Jul. 10, 1984

[54] COPOLYETHER ESTER AMIDES USEFUL AS THERMOPLASTIC ADHESIVES FOR HEAT SEALING TEXTILES

[75] Inventors: Salih Mumcu; Rainer Feldmann, both of Marl, Fed. Rep. of Germany

[73] Assignee: Chemische Werke Hüls AG, Marl, Fed. Rep. of Germany

[21] Appl. No.: 398,321

[22] Filed: Jul. 15, 1982

Related U.S. Application Data

[62] Division of Ser. No. 207,717, Nov. 17, 1980, Pat. No. 4,368,090.

[30] Foreign Application Priority Data

Dec. 6, 1979 [DE] Fed. Rep. of Germany ....... 2949064

[51] Int. Cl.$^3$ ..................... C08G 65/32; B32B 31/12; B32B 7/14
[52] U.S. Cl. .................................. 525/408; 525/423; 525/425; 525/934; 428/198; 428/200; 428/201; 428/206; 428/246; 428/261; 428/287
[58] Field of Search ................ 525/408, 934, 423, 425

[56] References Cited

U.S. PATENT DOCUMENTS 3,636,135  1/1972  Garforth ............................ 525/432
4,332,920  1/1982  Foy et al. ........................... 525/408

Primary Examiner—John C. Bleutge
Assistant Examiner—A. L. Carrillo
Attorney, Agent, or Firm—Wells & Wells

[57] ABSTRACT

Copolyether ester amides having a melting point between about 85° and 140° C. from:
(A) lactams of omega-aminocarboxylic acids and/or equivalent amounts of dicarboxylic acids and diamines as polyamide-forming compounds; and
(B) dicarboxylic acids and polyalkylene oxide diols as polyether ester forming compounds as thermoplastic adhesives for heat sealing textiles, where
the polyamide forming compounds consist of at least 30% by weight of lauryllactam and the remaining compounds together with lauryllactam result in copolyamides which have melting points which lie in the range between about 90° to 150° C.;
aliphatic dicarboxylic acids are used as the dicarboxylic acids; and
components A and B are used in the weight ratio from 93/7 to 35/65.

8 Claims, No Drawings

COPOLYETHER ESTER AMIDES USEFUL AS THERMOPLASTIC ADHESIVES FOR HEAT SEALING TEXTILES

This is a division of application Ser. No. 207,717, filed Nov. 17, 1980, now U.S. Pat. No. 4,368,090.

CROSS REFERENCE TO RELATED APPLICATIONS

Applicants claim priority under 35 U.S.C. 119 for application No. P 29 49 064.0, filed Dec. 6, 1979 in the Patent Office of the Federal Republic of Germany.

The disclosure of assignee's copending application Ser. No. 6,874, filed Jan. 26, 1979, now U.S. Pat. No. 4,237,040 is incorporated herein to show copolyamides, terpolyamides and suspension agents used for the polyamides in the spot coating of garment interlinings.

BACKGROUND OF THE INVENTION

The field of the invention is polyamide adhesives for textiles and the invention is particularly concerned with powdered mixtures of polyamides for heat sealing textiles by the powder dot process.

The state of the art of methods and apparatus for depositing powdered thermoplastic adhesive materials on the outer surface of textiles may be ascertained by reference to U.S. Pat. Nos. 4,139,613; 4,183,978; and 3,667,422; British Pat. No. 1,295,558, and the article entitled "From Basting to Binding Interlinings", in LICHTBOGEN 1972, no. 167 (5/XXI), pages 17–19, the disclosures of which are incorporated herein.

Copolyamides useful as adhesives and the state of the art thereof may be ascertained by reference to U.S. Pat. Nos. 2,252,555; 3,515,702; 3,839,121; 3,883,485; 3,883,487; 3,948,844; 3,950,297; 4,035,436; 4,046,747; 4,101,534 and U.S. Pat. No. Re. 27,939; British Pat. Nos. 1,458,640 and 1,548,431, Japanese Patent Application No. 76 19 034 as abstracted in Chemical Abstracts, Vol. 84 (1976) page 181,313g, and West German Published Applications Nos. 24 36 430 and 28 06 833, the disclosures of which are incorporated herein.

The state of the prior art of producing polyamide powders may be ascertained by reference to U.S. Pat. No. 4,143,025 and the Kirk-Othmer "Encyclopedia of Chemical Technology", 2nd ed., vol. 16 (1968) under the section "Polyamide (Plastics)", pages 88–105, particularly page 92—polylauryllactam (nylon-12), and polyundecamide (nylon-11), page 101, Solution Processes, and Powder Processing, pages 101–102, the disclosures of which are incorporated herein.

According to British Pat. No. 1,295,558, the spot coating of interlinings for textiles is carried out mainly by three methods:

1. A suitable plastic powder, for example, a polyamide or polyethylene based powder, is applied by a doctor blade to an engraving roller having recesses in the form of dots disposed in an even raster or grid formation and having a diameter of about 1 mm so that the plastic powder fills the recesses. The web of the interlining, which has been preheated to a high temperature by means of heating rollers, is passed around the engraving roller under tension and the plastic powder is transferred from the recesses to the web of interlining material (powder point or powder dot coating process).

2. A network of spots of a suitable plastic, such as polyethylene, is prepared in the form of a raster, the spots being interconnected by very fine webs. The network is applied dry to the hot interlining, the fine webs breaking up and disappearing, and the spots of the plastic fusing to the interlining. Interlinings of this kind have a relatively hard handle and can be fixed only on relatively heavy facing materials and the plastics also tend to bleed through and stick to the fixing press.

3. In the least expensive and least complex process, suitable plastics, such as PVC, polyamide or polyethylene, are mixed with plasticizers or in aqueous or solvent-containing media to form pastes which are printed by means of a printing roller formed with perforations arranged as a raster (paste printing process).

The condition for bonding textiles using the powder dot process are entirely different from the prior art uses of polyamide adhesives. By powder point process or powder dot coating process is meant the process especially described in U.S. Pat. No. 3,667,422 and as described as method one of British Pat. No. 1,295,558.

It is known to use copolyamides as thermoplastic adhesives for heat sealing textiles, in particular those containing the component lauryllactam, as disclosed in U.S. Pat. No. 3,515,702 and U.S. Pat. No. Re. 27,939. These thermoplastic adhesives evince good resistance to chemical cleaning in solvents, but on the other hand are not yet wholly satisfactory for the heat sealing of siliconized fabrics. Furthermore, they lack the "soft touch".

While copolyesters, especially polyether esters, evince a softer touch, they are less resistant to chemical cleaning.

Block copolymers are known from Japanese patent application No. 75 19034. These block copolymers are obtained from a polyamide-6-dicarboxylic acid, polytetrahydrofuran-diol and the transesterification of butanediol-(1,4) and dimethylterephthalate and dimethylisophthalate. Such copolyether ester amides evince too high a melting point and a low resistance to cleaning. The bonding shows excessive tendency to bleed through. Such products furthermore contain an excessive amount of extract.

SUMMARY OF THE INVENTION

Having in mind the limitations of the prior art it is an object of the present invention to produce thermoplastic adhesives in the form of copolyether ester amides for the heat sealing of textiles which have good wash resistance and cleaning resistance in chemical solvents.

Another object of the present invention is to obtain these adhesives which can be bonded at low temperatures.

Still another object of the invention is adhesives for textiles which better bind the bonding points in the powder dot process and avoid the bleed through effect.

A further object of the invention is adhesives for textiles which provide a soft touch.

In particular, the copolyether ester amides of the present invention are suited for coating and bonding siliconized fabrics. As regards such fabrics, the thermoplastic adhesives of the prior art lack both adequate bonding and sufficient resistance to washing and chemical cleaning.

The objects of the present invention are achieved by the use of copolyether ester amides having melting points between about 85° and 140° C. produced from:

(A) polyamide forming compounds having melting points between about 90° and 150° C. comprising not less than 30% by weight lauryllactam and other polyamide forming compounds selected from the group consisting of omega-aminocarboxylic acids, equivalent amounts of aliphatic dicarboxylic acids and diamines and mixtures thereof; and (B) polyether ester forming compounds comprising aliphatic dicarboxylic acids and polyalkylene oxide diols;

wherein the weight ratio of A/B is from about 93/7 to 35/65.

Preferably the weight ratio of components A to B is 90/10 to 50/50 and especially preferred is the ratio 85/15 to 55/45.

The polyamide forming compounds comprise at least two components, one of which is lauryllactam. The lauryllactam proportion is in the range of 30 to 75% by weight referred to the polyamide forming compounds. In particular the lauryllactam proportion is determined by the copolyamides of the copolyamide forming compounds evincing a melting point in the range from about 90° to 150° C., preferably between about 95° to 145° C. The melting point is determined in a Mettler FP 51 apparatus. Advantageously three or more copolyamide forming compounds are used. Besides Lauryllactam, or omega-aminododecanoic acid, or a mixture of both, lactams therefore with at least 6 C atoms are useful, such as caprolactam, and capryl lactam, amino carboxylic acids such as omega-aminoundecanoic acid, also equivalent amounts from aliphatic dicarboxylic acids such as adipic acids, azelaic acid, sebacic acid, dodecanoic diacid and diamines such as hexamethylenediamine, dodecamethylenediamine, isophoronediamine, trimethylhexamethylenediamine, 4,7-dioxadecane diamine-(1,10), and 4,9-dioxadodecane diamine-(1,12). These components are used especially in the form of their salts. Branched chain dicarboxylic acids such as trimethyl adipic acid are also useful as aliphatic dicarboxylic acids.

The products obtained evince a low lactam content, so that extraction is not required.

Illustratively, the following polyamide forming compounds are useful:

lauryllactam and caprolactam in a 75/25 weight ratio;

lauryllactam and caprolactam in a 55/45 weight ratio;

lauryllactam, caprolactam and AH salt (a salt of adipic acid and hexamethylene diamine) in a 69/25/15 weight ratio;

lauryllactam, caprolactam and DH salt (a salt of dodecanoic diacid and hexamethylene diamine in a 50/25/25 weight ratio;

lauryllactam, caprolactam and a salt of dodecanoic diacid and isophoronediamine in a 60/20/20 weight ratio;

lauryllactam, AH salt and DH salt in a 50/30/20 weight ratio;

lauryllactam, caprolactam, AH salt and DH salt in a 40/30/15/15 weight ratio; and lauryllactam, caprolactam, aminoundecanoic acid, salt of hexamethylene diamine and azelaic acid in a 40/25/20/15 weight ratio.

The following polyether ester forming components are used:

($B_1$) Aliphatic linear or branched dicarboxylic acids having 6 to 13 C atoms, such as adipic acid, trimethyladipic acid, pimelic acid, suberic acid, azelaic acid, sebacic acid and dodecanoic diacid. Preferred are adipic acid, azelaic acid, sebacic acid and dodecanoic diacid.

($B_2$) Polyalkylene oxide diols, which are derived from ethylene oxide, propylene oxide and tetrahydrofuran. The polyalkylene oxides may be homopolymers and/or copolymers. Mixtures of homo and copolymers also are useful. Their numerical mean molecular masses are between about 250 and 3,000 and preferably between 300 and 2,200 and especially preferred between 500 and 1,200. They contain OH end groups. (Polytetrahydrofuran)-diol is preferred. The components $B_1$ and $B_2$ are preferably used in the molar ratio of 1/0.95 to 1/1.05.

The copolyether ester amides of the present invention have melting points from about 85° to 140° C.

The copolyether ester amides are appropriately produced in an agitated autoclave by known polycondensation processes, for instance by the method of hydrolytic lactam polymerization disclosed in U.S. Pat. No. 3,799,899. Advantageously first lactams, omega-aminocarboxylic acids and dicarboxylic acids and possibly in the presence of a catalyst are polymerized at 250° to 290° C. within ½ to 8 hours or precondensed at a steam pressure of 10 to 20 bars. After the reaction is decompressed, polyalkylene oxide and possibly diamine is added, polycondensation then taking place either at normal pressure or in vacuum at pressures between 100 mbar and 5 mbar until the desired degree of polycondensation is reached. It is especially advantageous to homogenize the reaction mixture prior to the polycondensation at a steam pressure of 5 to 20 bar within 15 minutes to 4 hours.

Besides this discontinuous process, continuous processes may also be used.

The desired relative solution viscosities $\eta_{rel}$ (measured in m-cresol per German Industrial Standard DIN 53 727) are between about 1.3 and 1.75, preferably between 1.35 and 1.70.

Suitable catalysts are phosphoric acid, amino salts of phosphoric acid, zinc acetate and calcium acetate in amounts of 0.01 to 0.3% by weight referred to the entire weight. Phosphoric acid in amounts of 0.02 to 0.1% by weight are preferred for use. The catalyst may be added prior to and during the polycondensation stage.

The thermoplastic adhesives are used in the form of powders. The powders are produced preferably by cold grinding and subsequent grading. If desired, the powders may also be prepared by the so-called precipitation method.

The grain size distribution of the powders is less than 80 microns when used with the paste printing method, from about 60 to 200 microns with the powder dot method, and from about 200 to 500 microns with the powder scattering method.

The powders may contain conventional additives where desired, for instance, such metal soaps as Ca-stearate, Zn-stearate, optical brighteners or possibly stabilizers such as sterically inhibited phenols.

The powders listed in Table 1 below with a grain size distribution from 60 to 200 microns were deposited on a commercial interlining by means of a powder dot machine as disclosed by Swiss companies "Saladin" or "Carratsch" or German Company "Knobel" with an 11-mesh screen and a deposition weight of 18+/−2 g/m². A commercial siliconized top fabric was bonded on an ironing press at a pressure of 350 p/cm² and a temperature of 160° C. The bonded pieces were washed three times with a commercial mild washing agent and were cleaned five times with a conventional chemical cleaning agent. The separation resistance was determined per German Industrial Standard DIN 54 310, the values being indicated in N/5 cm.

The numbers 1000 and 650 in Column 2 of Table 1 are the numerical mean molecular masses of the PTHF.

The control tests show that for too low a proportion in poly(tetrahydrofuran) the touch was hard and the bonding points showed through (control test 1), and that for a lauryllactam content of less than 30% by weight (referred to the polyamide-forming compounds) and for a proportion of polyalkylene oxide in excess of 65% by weight (referred to the total weight), the separation resistance drops following chemical cleaning (control tests 2 and 3).

Control test 4 displays the state of the art as provided by Japanese patent application No. 76 19034.

| Abbreviations | |
|---|---|
| AH salt | salt of adipic acid and hexamethylene-diamine |
| BD | butanediol-1,4 |
| CL | caprolactam |
| DH salt | salt of dodecanoic diacid and hexa-methylene diamine |
| AUS | omega-aminoundecanoic acid |
| DDS | dodecanoic diacid |
| LL | lauryllactam |
| IPD | isophorone diamine |
| HMD | hexamethylene diamine |
| AzS | azelaic acid |
| AS | adipic acid |
| PTHF | poly(tetrahydrofuran)diol |

BEST METHOD OF CARRYING OUT THE INVENTION

As an example of the best method of preparing the copolyether ester amides used in the present invention the preparation of the copolyether ester amide of Example 1 is described. This copolyether ester amide containing 45% by weight lauryllactam, 20% by weight caprolactam 6.5% by weight dodecanoic diacid and 28.5% by weight poly(tetrahydrofuran)diol is prepared by heating in absence of oxygen in an autoclave to 280° C. a mixture of 45 parts by weight of lauryllactam, 20 parts by weight of caprolactam, 6.5 parts by weight of dodecanoic acid, 0.05 parts by weight of phosphoric acid ($H_3PO_4$) and 3 parts by weight of water and thereby agitating the mixture. At this temperature it is furthermore agitated for 6 hours at a steam pressure of 18 to 20 bars. After the autoclave is decompressed 28.5 parts by weight of poly(tetrahydrofuran)diol with a molecular mass of 1 000 and 2 parts by weight of water are added. Then at a steam pressure of about 15 bars is agitated for 2 hours at a temperature between 250° and 270° C. After repetition decompressing the polycondensation is carried out within 6 hours until a $\eta_{rel}$-value of 1.65 is reached while thereby passing over gaseous nitrogen.

TABLE 1

| Example | Kind and composition (% by wt) of copolyether ester amides | Proportion (% by wt) of LL in polyamide | Polyamide Proportion A (% by wt) | Polyether ester proportion B (% by wt) |
|---|---|---|---|---|
| 1 | LL/CL/DDS/PTHF 1000<br>45 20 6.5 28.5 | 69.2 | 65.0 | 35.0 |
| 2 | 38 27 6.5 28.5 | 58.5 | 65.0 | 35.0 |
| 3 | 53 22 4.5 20.5 | 70.7 | 75.0 | 25.0 |
| 4 | LL/Cl/AH-salt/AS/PTHF 1000<br>36 15 9 5 35 | 60.0 | 60.0 | 40.0 |
| 5 | 36 20 24 2.5 17.5 | 45.0 | 80.0 | 20.0 |
| 6 | LL/CL/DH-salt/DDS/PTHF 1000<br>38 17 24 3.6 16.4 | 48.8 | 80.0 | 20.0 |
| 7 | LL/CL/AzS-NMD/AzS/PTHF 1000<br>36 20 24 3 17 | 45.0 | 80.0 | 20.0 |
| 8 | LL/CL/AH-salt/DH-salt/AzS/PTHF 650<br>34 25 13 13 3.3 11.7 | 40.0 | 85.0 | 15.0 |
| 9 | LL/CL/DDS/Polyethyleneglycol 1000<br>45 20 6.5 28.5 | 69.2 | 65.0 | 35.0 |
| 10 | LL/CL/DDS/PTHF 650<br>32 18 12.6 37.4 | 64.0 | 50.0 | 50.0 |
| Control tests | | | | |
| 1 | LL/CL/AH-salt/DDS/PTHF 1000<br>38 38 19 0.9 4.1 | 40.0 | 95.0 | 5.0 |
| 2 | LL/CL/AH-salt/AS/PTHF 1000<br>15 36 9 5 35 | 25.0 | 60.0 | 40.0 |
| 3 | LL/CL/DDS/PTHF 1000<br>17 13 13 57 | 56.7 | 30.0 | 70.0 |
| 4 Jap. patent appl. 76 19034 | CL/AS/DMT/DMIS/PTHF 1000/BD<br>28.20.7 16.1 9.1 29 16.9 | — | 28.2 | 71.8 |

| Example | $\eta_{rel}$ | melting point | separation resistance | | | touch | transparency |
|---|---|---|---|---|---|---|---|
| | | | untreated | after wash | after chemical cleaning | | |
| 1 | 1.65 | 133 | 12 | 11 | 8 | very soft | no |
| 2 | 1.50 | 131 | 11 | 10 | 8 | " | no |
| 3 | 1.60 | 140 | 13 | 10 | 7 | " | no |
| 4 | 1.60 | 114 | 13 | 11 | 6 | " | no |
| 5 | 1.55 | 126 | 12 | 10 | 8 | " | no |
| 6 | 1.48 | 122 | 13 | 11 | 8 | " | no |
| 7 | 1.62 | 121 | 12 | 10 | 7 | " | no |
| 8 | 1.48 | 89 | 12 | 9 | 7 | " | no |

TABLE 1-continued

| | | | | | | | |
|---|---|---|---|---|---|---|---|
| 9 | 1.57 | 129 | 13 | 5 | 7 | soft | no |
| 10 | 1.55 | 120 | 12 | 9 | 6 | very soft | no |
| Control tests | | | | | | | |
| 1 | 1.55 | 122 | 15 | 12 | 6 | hard | yes |
| 2 | 1.60 | 130 | 12 | 6 | 2 | very soft | no |
| 3 | 1.50 | 105 | 9 | 6 | 3 | " | no |
| 4 | 1.65 | 159 | not ascertainable | | | soft | yes |

We claim:

1. Thermoplastic adhesives for heat sealing textiles in a powdered form having a grain size between about 60 to 500 microns comprising copolyether ester amides having melting points of about 85° to 140° C. and relative solution viscosities between about 1.3 and 1.75 produced from:
   (A) polyamide forming compounds comprising not less than 30% by weight lauryllactam, omega-aminododecanoic acid or a mixture thereof, and other polyamide forming compounds selected from the group consisting of omega-aminoundecanoic acid, lactams having at least six carbon atoms, equivalent amounts of aliphatic dicarboxylic acids and diamines and mixtures thereof wherein copolyamides formed from said polyamide forming compounds have melting points between about 90° to 150° C.; and
   (B) polyether ester forming compounds comprising aliphatic dicarboxylic acids and poly(tetrahydrofuran) diol; wherein the weight ratio of A to B is from 93/7 to 35/65.

2. The adhesives of claim 1, wherein said weight ratio is 90/10 to 50/50.

3. The adhesives of claim 1, wherein said weight ratio is 85/15 to 55/45.

4. The adhesives of claim 1, wherein said lauryllactam concentration is about 30 to 75% by weight of component A.

5. The adhesives of claim 1, in a powdered form having a grain size between about 60 and 200 microns.

6. The adhesives of claim 5, wherein said powdered form is achieved by the cold grinding method.

7. Thermoplastic adhesives for heat sealing textiles in a powdered form having a grain size between about 60 to 500 microns comprising copolyether ester amides having melting points of about 85° to 140° C. and relative solution viscosities between about 1.3 and 1.75 produced from:
   (A) polyamide forming compounds comprising not less than 30% by weight lauryllactam and other polyamide forming compounds selected from the group consisting of caprolactam; caprolactam and a salt of adipic acid and hexamethylene diamine; caprolactam and a salt of dodecanoic diacid and hexamethylene diamine; caprolactam and a salt of dodecanoic diacid and isophoranediamine; a salt of adipic acid and hexamethylene diamine and a salt of dodecanoic acid and hexamethylene diamine; caprolactam, and salts of adipic acid and hexamethylene diamine and dodecanoic acid and hexamethylene diamine; caprolactam, aminoundecanoic acid and a salt of hexamethylene diamine and azelaic acid, wherein copolyamides formed from said polyamide forming compounds have melting points between about 90° to 150° C.; and
   (B) polyether ester forming compounds comprising aliphatic dicarboxylic acids having 6 to 13 carbon atoms and poly(tetrahydrofuran) diol; wherein the weight ratio of A to B is from about 93/7 to 35/65.

8. The adhesives of claim 7, wherein said aliphatic dicarboxylic acids of component B are selected from the group consisting of adipic acid, trimethyladipic acid, pimelic acid, suberic acid, azelaic acid, sebacic acid and dodecanoic diacid.

* * * * *